US012694155B2

(12) United States Patent
Fust et al.

(10) Patent No.: US 12,694,155 B2
(45) Date of Patent: Jul. 28, 2026

(54) METHOD AND SECURE ELEMENT FOR DETECTING A TRUSTED ELECTRONIC ASSEMBLY

(71) Applicant: WiBu-Systems AG, Karlsruhe (DE)

(72) Inventors: Ralf Fust, Durmersheim (DE); Oliver Winzenried, Karlsruhe (DE); Wolfgang Neifer, Karlsruhe (DE)

(73) Assignee: WiBu-Systems AG, Karlsruhe (DE)

( * ) Notice: Subject to any disclaimer, the term of this patent is extended or adjusted under 35 U.S.C. 154(b) by 394 days.

(21) Appl. No.: 17/924,709

(22) PCT Filed: May 14, 2021

(86) PCT No.: PCT/EP2021/062892
§ 371 (c)(1),
(2) Date: Nov. 11, 2022

(87) PCT Pub. No.: WO2021/229084
PCT Pub. Date: Nov. 18, 2021

(65) Prior Publication Data
US 2023/0185968 A1 Jun. 15, 2023

(30) Foreign Application Priority Data

May 14, 2020 (EP) .................................... 20174702

(51) Int. Cl.
*G06F 21/64* (2013.01)
*G06F 21/57* (2013.01)
*G06F 21/72* (2013.01)

(52) U.S. Cl.
CPC ............ *G06F 21/64* (2013.01); *G06F 21/575* (2013.01); *G06F 21/72* (2013.01)

(58) Field of Classification Search
CPC ......... G06F 21/575; G06F 21/64; G06F 21/72
(Continued)

(56) References Cited

U.S. PATENT DOCUMENTS 6,988,250 B1 * 1/2006 Proudler ............... G06F 21/445
713/160
2011/0296201 A1 * 12/2011 Monclus ................. G06F 21/53
718/1
(Continued)

OTHER PUBLICATIONS

Gallery et al., "Trusted Mobile Platforms," Foundations of Security Analysis and Design IV, pp. 282-323, Aug. 2007.
(Continued)

*Primary Examiner* — Dant B Shaifer Harriman
(74) *Attorney, Agent, or Firm* — Rouget F. Henschel; Potomac Law Group, PLLC

(57) ABSTRACT

The invention relates to a method and a secure element for detecting the trustworthiness of an electronic assembly (100). The secure element (200) comprises a control unit (210), a record storage device (230), and a secure storage device (220); the record storage device (230) comprises a target state value (235) of the assembly (100); the secure storage device (220) comprises a private key (226) of a proof of origin (222); the secure element (200) has a public key (224) of the proof of origin (222), said public key being output to a requesting processing unit; and the control unit (210) is designed to carry out the method in order to detect the trustworthiness. The method has the steps of ascertaining an actual state value (233) of the actual state of the assembly (100), reading the target state value (235) from the record storage device (230), verifying the authenticity of the secure element (200), processing the actual state value (233) and the target state value (235), and deciding whether the actual state is sufficiently similar to or compatible with or matches the target state such that a trust criterion is satisfied.

27 Claims, 9 Drawing Sheets

(58) Field of Classification Search
USPC .......................................................... 713/176
See application file for complete search history.

(56) References Cited

U.S. PATENT DOCUMENTS

| | | | |
|---|---|---|---|
| 2012/0131334 A1* | 5/2012 | Haikney | G06F 21/57 |
| | | | 713/156 |
| 2015/0193221 A1* | 7/2015 | Khan | G06F 21/57 |
| | | | 713/176 |
| 2016/0164883 A1* | 6/2016 | Li | H04W 8/205 |
| | | | 726/7 |
| 2016/0275461 A1* | 9/2016 | Sprague | G06Q 20/3829 |
| 2017/0155513 A1* | 6/2017 | Acar | G06Q 20/20 |
| 2019/0220419 A1* | 7/2019 | Lin | G06Q 50/184 |
| 2020/0084202 A1* | 3/2020 | Smith | H04W 12/08 |

OTHER PUBLICATIONS

International Search Report issued in application No. PCT/EP2021/062892 dated Aug. 11, 2021.

* cited by examiner

METHOD AND SECURE ELEMENT FOR DETECTING A TRUSTED ELECTRONIC ASSEMBLY

The present invention relates to a method for providing proof of trusted electronics, in particular electronic assemblies and hardware components, and to a secure element for providing proof of the trustworthiness of an electronic assembly, in particular having trusted electronics, preferably having applications, for critical infrastructures.

The development and provision of trusted electronics having applications for critical infrastructures is of the greatest importance to manufacturers of embedded systems. In particular the electronics used in "digital factories" or in highly automated processes are expected to have the highest level of reliability and availability. This applies in particular to critical infrastructures, such as for example in medical engineering, transport engineering or in food manufacture. Each of these infrastructures has specific requirements for the trustworthiness of equipment, production engineering and instrument engineering. Trust is based on certifiability and checkability of the equipment and the electronic assemblies and (hardware) components thereof. In globalized production chains, traceability of the trustworthiness of electronic components in all processes such as production (split manufacturing) and commissioning by the manufacturers, the system integrators and by the operators of these components is particularly important. In principle, the practice-oriented tracing of trusted products in transnational trade, e.g. at customs posts, is also suitable for providing proof of a certificate of origin, which proof may be retrieved digitally.

The present invention is based on the object of proposing a method and an apparatus that may be used to furnish robust and reliable proof of the trustworthiness of an electronic assembly.

The present object is achieved by way of a method having the features of claim 1 and by way of a secure element having the features of claim 11.

According to a first aspect, the invention relates to a method for providing proof of a trusted electronic assembly having a CPU, a bus interface and a secure element that comprises a proof of origin and has a record memory containing a target state value of the assembly. The method comprises the following steps: determining an actual state value of an actual state of the assembly, optionally storing the actual state in a record in the record memory, optionally checking and optionally determining whether the assembly has a secure element containing proof of origin, reading the target state value from the record memory, the target state value representing a target state of the assembly, checking the secure element for authenticity by checking the proof of origin of the secure element, processing the actual state value and the target state value and/or comparing the target state and the actual state and assessing and deciding whether the actual state is similar to or compatible with or matches the target state insofar as a trust criterion is satisfied.

The actual state and the target state of the assembly represent the composition of the assembly and of its subassemblies and components. If the states are the same, the assembly is consistent with the original state during production or initial commissioning and comprises the components and subassemblies that were originally installed. The states may be similar when a predetermined number of subassemblies is the same or has the same properties or features By way of example, the assembly could be trusted, that is to say the stipulated trust criterion could be satisfied, if 70% of the subassemblies are identical (e.g. identity of the serial number), specific subassemblies of the assembly needing to be included in this group of 70%. There may be sufficient compatibility if for example at least 40% of the subassemblies are the same and a further 50% have the same properties, e.g. electrical properties or current responses during booting or the like, there possibly being a stipulation that specific subassemblies need to be identical. These trust criteria may be predefined by the manufacturer or commissioning engineer of the assembly or by the user of the assembly, in order to preclude later alteration or tampering.

The target state value may comprise dynamic data of a component or of the assembly, such as for example a voltage and current response when the component or assembly is started up or started.

The target state value may also comprise static data of the assembly and/or of a component, such as for example the serial number, the production date, a production batch or series, current or voltage values, clock frequencies or similar parameters that describe and characterize the component.

The target state value may also comprise cryptographic operations with IP elements distributed over the assembly. These are e.g. keys, physical unclonable functions (PUF), physical obfuscated keys (POK).

The actual state values correlate with the target state values. That is to say that the values or parameters recorded as target state values are retrieved. Determination may include receiving the actual state value of the assembly, of a component of the assembly or of an external component. A component could be e.g. a sensor, a memory, an SD card, a CPU, an SoC (system on chip) or an IP with a unique ID (identity) or key, or the like. It is also possible to interrogate sensors or processors and processing units in order to determine the actual state values. The actual state value may also comprise static data of a component, as explained above, for example, that is to say for example the serial number, the production date, a production batch or series, current or voltage responses, clock frequencies, keys, physical unclonable functions, physical obfuscated keys or similar parameters that describe and characterize the component.

The processing of the actual state value and the target state value may comprise transforming or reading individual values or parameters from the state values. It is possible to query whether specific parameters or components are currently present in the assembly and were also present at the time of the defined target state. If necessary, individual parameters may be processed or combined with cryptographic keys or other proofs before a decision about the trustworthiness of the assembly may be made. In a simple embodiment, the target state, or target state value, may be compared with the actual state, or actual state value.

The trust criterion is defined as the evaluation algorithm for a number of actual values (actual state values) with a number of target values (target state values).

In a simple embodiment, a check for equality is performed, that is to say each actual value is compared with the associated target value, and the trust criterion is satisfied if they are the same. The evaluation algorithm may also be performed by an AI unit. In this case, the target state consists of the previously determined parameters of a previously ascertained AI algorithm. The evaluation algorithm may also consist of a data series obtained as the actual state with added error correction data, in order to allow a tolerable difference.

The trust criterion is deemed satisfied if a previously determined number of values or parameters of the actual state match the target state exactly or in part, that is to say if the match exists between the actual state values and the equivalent, in other words corresponding, target state values. The values or parameters may also yield or comprise a normalized measure between 0 a 1 in a weighted form. Said measure then needs to be equal to or greater than a previously determined threshold value. The values or parameters may be transmitted individually or in combination as keys for encrypting a "challenge". The values may optionally be combined outside the checking unit. Values may preferably also be combined using an AI unit (artificial intelligence unit) on which for example neural networks, Petri networks, Hidden-Markov models or the like are implemented. The combination of data may also be transmitted as data that are optionally encrypted.

The evaluation algorithm may also be obtained from a weighted and normalized assessment of multiple values and parameters of the actual state, and may be a measure of the match between the target and actual states [0 . . . 1], and the trust definition may be determined by way of a threshold value. A proof of authenticity of the secure element is provided by checking the proof of origin of the secure element. The checking may comprise querying whether a proof of origin is present or whether the proof of origin has a particular form, for example comprises a certificate. There may be provision for further checks on the authenticity of the secure element, for example checking the certificate of origin using a public key infrastructure (PKI) or checking the presence of a private key in the secure element.

The method according to the invention may be initiated and triggered by a CPU or processing unit, or processor unit, and at least part thereof may take place in the CPU, or processing unit. At least part of the method may alternatively also take place or be initiated in a hardware component, for example in an FPGA with an additionally produced secure processor. In these cases, the sequence of the method involves querying and checking whether a secure element is present on the assembly and whether it has a proof of origin. If the method is carried out in a secure element, this method step may be dispensed with or reduced to determining and checking whether a proof of origin is present.

The method according to the invention has the advantage that it is possible to establish whether the assembly is consistent with a target state and whether the assembly, or components, is unchanged since production in a simple, fast and secure and also robust manner. The method makes it possible to rule out parts of the assembly having been changed and components having been replaced or parts of the components not or no longer being original. A prerequisite is that the assembly has a secure element that has a proof of security or authenticity (proof of origin) and a record memory that stores at least target state values of a target state at the end of production or preferably in a (secure) commissioning phase.

The invention furthermore allows a secure, trusted and counterfeit-proof supply chain from the semiconductor manufacturer through the manufacturers of the electronic assemblies to the production of ready-to-operate products. Besides the proofs from the production records (target state values), these preferably also include the proofs of origin for individual parts of the assembly (semiconductor system components) with identities that are preferably locally derivable and checkable during initial commissioning, preferably on the basis of keys stored in the secure element, signed fingerprints, or hash values, and certificates of origin. In particular the dovetailing of hardware and software, which is oriented to trustworthiness, is rendered possible by means of the invention. The configuration of the records of trust at local system level for the purpose of shaping and monitoring system integrity is a preferred implementation.

The preferably cryptographic "linking" of preferably all ID features results in the composition (production) of a new, unalterable identity of the assembly that represents the trusted digital identity with the initial commissioning of the hardware logic and preferably the software. Together with a previously generated proof of origin, or certificate, this is used for independent proof of authenticity in further phases of a commissioning.

Flexibility in the application of the method is advantageous. The method may be applied both in small assemblies having few system resources and in multiprocessor systems. In order to prevent the unauthorized replacement of semiconductor components, detecting a plurality of components having an applicable plurality of stored features may increase the number of items of checkable record data and therefore the protection against reproduction. Preferably, as early as in production it is possible to plan or stipulate how security-critical production steps, including the acquisition of record data (target state values), are implemented and may be coordinated with other components, for example relating to software.

If reference patterns relating to an assembly are present, the degree of automation for production may advantageously also be implemented in a comparatively unsafe production environment. By way of example, the application of assembly self-tests could contribute thereto and reduce manufacturing costs without restricting the trustworthiness that is sought.

In a further aspect, the invention relates to a secure element for providing proof of the trustworthiness of an electronic assembly, wherein the secure element comprises a control unit, a record memory and a secure memory and also an optional interface. The record memory comprises a target state value of the assembly. The secure element has a public key of the proof of origin, which key may be output to an enquiring processing unit, or CPU, of the assembly. The secure memory of the secure element comprises a private key of a proof of origin. The control unit of the secure element for providing proof of trustworthiness is configured and designed to receive and process an actual state value of the assembly, respond to an enquiry from the processing unit concerning whether a proof of origin is present in the secure element by using the private key, and read the target state value of the assembly from the record memory. The control unit is further configured and designed to process and/or compare the actual state value and the target state value, and to assess and/or decide whether the actual state is similar to or compatible with or matches the target state insofar as a trust criterion is satisfied.

A further aspect of the invention relates to an electronic assembly having a CPU (processing unit), a bus interface and a memory. The assembly comprises a secure element for providing proof of the trustworthiness of the assembly, the secure element having a control unit, a record memory and a secure memory, and the secure element preferably being configured and designed to carry out at least part, preferably all, of the method according to the invention that is described above.

A further aspect of the invention relates to a hardware component for providing proof of a trusted electronic assembly. The hardware component has a protected security processor, a record memory and a secure memory. The hardware component is a component of the assembly to be checked and is configured and designed to carry out the above method. By way of example, the hardware component may be part of a system on chip (SoC) of the assembly. The hardware component may also be connected, preferably detachably connected, to the assembly by means of an interface.

Further aspects of the invention relate to a computer program and a computer program product containing program code for performing the steps of the method when the program code is executed on a computer or a hardware component or an electronic assembly, and to a storage medium storing a computer program that, when executed on a computer or a CPU, causes execution of the method described herein.

The secure element may also be executed in a multiprocessor system in a processor that is able to access a record memory containing the target state value and a secure memory containing the proof of origin. By way of example, the secure element could also be integrated in an FPGA. In these cases, the check on the proof of origin may be dispensed with, it being preferable to query whether a proof of origin is present.

Alternatively, the secure element could also be implemented exclusively in software or a computer program. All the functions of a secure element would therefore be realized in software. The software is able to access the necessary memories in these cases.

Preferred configurations of the invention are described in the dependent claims. It goes without saying that the features cited above and those yet to be explained below may be used not only in the respective indicated combination but also in other combinations or on their own without departing from the scope of the present invention. In particular, the method and the computer program product may be embodied in accordance with the configurations described for the apparatus in the dependent claims.

In one preferred embodiment of the method according to the invention, there is provision for a further step comprising authorizing and/or influencing the assembly whose trustworthiness is checked. This involves influencing the use of the assembly on the basis of the assessment. By way of example, the assembly may be reset, with the result that the assembly, or its CPU, reboots. It is also possible to disable individual or all components in the event of a negative assessment. A positive assessment of trustworthiness may be a prerequisite for enabling individual components, areas or elements of the assembly. Similarly, a process taking place on the assembly may be influenced, for example terminated, or authorized. Branches are possible within a process or program.

The proof of origin or at least a portion thereof is preferably stored in the secure element in encrypted form. The proof is preferably stored in a separate memory, preferably a protected memory, for example a secure memory. This is preferably separate from the record memory. There may be access restrictions for the secure memory and/or the record memory; the secure memory may e.g. be read only by the security processor. There may be provision for rights management that allocates particular rights for the memory to the secure element. The rights management may provide write rights only for the production process and optionally also for a commissioning. It may optionally provide the stored elements with an indication or parameter relating to the time and/or relating to the process step in the manufacture or commissioning.

In one preferred embodiment of the invention, the proof of origin may comprise a certificate of origin. By way of example, the certificate may preferably be a key certificate, which preferably comprises multiple parts, at least one certificate part of which may be encrypted. The key certificate preferably comprises a public key and a private key, which is preferably particularly protected or encrypted.

The checking of the proof of origin to provide proof of the authenticity of the secure element preferably first comprises the step of reading the public key of the secure element, preferably from the secure memory. Authorized reading preferably takes place. If the public key exists in the secure element in encrypted form, the public key could be optionally decrypted. One method step provides for a check to ascertain whether the private key belonging to the read public key is present in the secure element. In other words, a check is performed to ascertain whether the key pair comprising the private key and the public key goes together. A check is preferably performed to ascertain whether the appropriate private key is stored in the secure memory.

If the proof of origin is preferably a key certificate having a private key and a public key, the presence of the private key in the secure element is preferably checked by means of further steps. First, an at least partly arbitrary data value is generated, e.g. a random value. The data value preferably has a random part and a predefined part (e.g. the present date or an arbitrary serial number). This is transmitted to the secure element, where it is encrypted using the private key to produce a result value. Following output from the secure element, the result value is decrypted using the public key. In a further step, the result value is checked on the basis of the previously generated data value (random value). This involves comparing the result value and the data value. 100% matching is preferably performed here.

In one preferred embodiment, the method according to the invention is carried out during the process of an assembly. To this end, during the boot process, there may be provision at some points in the boot event for this method to be started. Parts of the method may be initiated and controlled by the main processor of the assembly, or the processing unit of the assembly. Parts of the method may be carried out by the CPU, or processing unit. The processor or the CPU of the assembly then calls the secure element in order to have the method steps taking place there executed.

The boot process of the assembly or the boot process of assembly components is preferably influenced. This involves taking the method that is carried out and the result of the check on the trust criterion as a basis for altering or adapting the boot process. Individual components of the assembly may be disabled or initiated. The boot process may be modified such that some assemblies or components are called or booted only if the trustworthiness of the previous components has been proved in a preceding step. Software licenses that might be needed in the remainder of the boot process may also be disabled or not enabled.

In one preferred embodiment, individual steps of the method according to the invention, such as for example the checking of actual state values and target state values, are performed for individual components of the assembly or hardware components of the assembly, and the trust criterion for this component is determined. The method is preferably then performed again, but for the next component of the assembly. Control and selection of the components may be initiated and controlled by a boot process of the assembly. This may take place on the basis of the check on the trustworthiness of other assemblies or components. To this end, multiple entries, that is to say multiple target state values, are preferably stored in the record memory of the secure element, a dedicated target state value preferably being stored and recorded for each assembly, or for each hardware component of an assembly. The applicable actual state values of the individual components are prompted, initiated and/or controlled either by the CPU of the assembly, another processor of a component of the assembly or by the secure element.

One likewise preferred embodiment of the method according to the invention provides for the method to be able to be carried out during the boot process. The method according to the invention is called at applicable points in the boot process that are provided for this purpose. That is to say that the boot process branches to the method according to the invention. The boot process is preferably influenced by the method according to the invention. In other words, the boot process is dependent on the results that the method delivers. The sequence of the boot process may particularly preferably be altered. By way of example, the determined trust criterion of a component of the assembly may be taken as a basis for carrying out a different order or other parts of the boot process.

In one preferred embodiment of the method according to the invention, the record memory stores an element for providing proof of the trusted production of the assembly in the form of a target state value of the assembly. The record memory preferably stores at least one element for providing proof of the trusted production of a component in the form of a target state value. The elements, or target state values, comprise information concerning the manufacture or processing of the assembly. Said information may exist in the form of a dataset. By way of example, a production location, a production time or other production-specific parameters may be stored in the element. The element corresponds to the target state value. Information about a specific configuration in the production of the assembly, for example an order in which different components of the assembly were fitted, or what equipment was used for production, is also conceivable. The elements, or target state values, are preferably linked to one another. They are particularly preferably strung together and linked in the form of a chain, preferably added to the end thereof. The target state values stored in the record memory then correspond to a record chain, which forms a digital identity of the electronic assembly and therefore contributes to the trustworthiness of the assembly.

One particular embodiment of the method or of the secure element may provide for a check performed on the trustworthiness of the assembly or on the trustworthiness of a component of the assembly to be taken as a basis for generating a new element for the record memory. This element is then stored in the record memory, preferably with a link to existing elements, or entries, in the record memory. New elements are thus linked to already existing elements. This linking particularly preferably likewise takes place in the form of a chain, for example in the form of a record chain. The new elements are preferably added to the end of the chain, a particular preference being that no elements may be inserted between existing elements. It is conceivable for new elements to be added to existing elements in the form of a branch.

The record memory therefore preferably comprises not only target state values but also further elements, which may be added during the check on the trustworthiness of the assembly or of a component of the assembly. This means that, even at a later time, it is still possible to prove that the assembly was trusted at a previous time, that is to say a time in the past. The record memory therefore comprises not only entries (records) that were generated during production but preferably also entries that were generated at a later time. Besides entries that result from the check on trustworthiness during operation of the assembly, entries may also be generated during the initial commissioning of the assembly.

Entries or elements in the record memory of the secure element that were generated earlier are then equated with the target state values and also referred to as target state values within the context of this invention.

Updating the record chain or linking chain in the record memory updates records of trust, the first element of which is preferably the proof of origin, that is to say the proof of the authenticity, of the secure element, however. This has the advantage that it is possible to tell at any time during operation of an assembly when and which trusted components and subassemblies were installed and when there was trust during commissioning and/or during operation. Trustworthiness may preferably extend not only to components of the assembly but also to installed and implemented firmware or software for individual components of the assembly.

In one preferred embodiment of the method according to the invention, the target state values comprise multiple features of the assembly or multiple features of components. In the simplest case, for example, the features may preferably be a serial number, a production date, a production batch, an assembly or the like. In addition, they may be voltage or current values, specific clock frequencies or clock rates, software version levels at specific times, production sites or locations or data, maintenance or repair information on the like. By way of example, one feature could also be a maximum power requirement for starting up the assembly or in a specific operating state. The list of features provided here should not be understood to be exhaustive. Other features are likewise conceivable.

In one preferred embodiment of the secure element, the target state values in the record memory may be cryptographically secure, for example they may be encrypted. Multiple target state values or multiple entries in the record memory are preferably strung together, the stringing-together or concatenation particularly preferably needing to take place in a stipulated order. The series of entries preferably begins with a link or reference to the authenticity, or the proof of origin, of the secure element. The link or a representational value for the link or a representational value for the proof of authenticity of the secure element may be stored in the record memory, preferably in encrypted form. This may preferably be the first entry in the records of trust, or the series of elements or state values stored in the record memory. When multiple target state values are strung together in a stipulated order, the term "target state value" also comprises values or entries in the record memory that were not generated during production and comprise production-specific data or parameters. Rather, specific values that were generated during commissioning of the assembly may also be stored in the form of target state values. A subsequent trustworthiness check during operation may also preferably be recorded in the record memory in the form of a "target state value".

One particular embodiment of the secure element provides for proof of trustworthiness to be provided by carrying out a weighted assessment of the actual state value and the target state value. The actual state values and target state values may be values of the assembly or of components of the assembly. The target state values may each comprise not only production data but also data from earlier checks or from a commissioning (initial commissioning). A weighted assessment may provide for the trustworthiness of individual components to be able to be lower and for a high rating to need to be obtained only for specific or particular components. The same applies for the assessment of the trustworthiness of the assembly. Here, a distinction may be drawn between a comparison or matching between present actual state values and target state values during production, or in relation to target state values from earlier checks that may be included with a lower rating. The assessment of the state values may be carried out in the secure element itself. The assessment may likewise preferably be performed by other components of the assembly.

In one preferred embodiment, the secure element has an interface in order to be able to interchange data, entries in the secure memory and/or in the record memory, interim results or instantaneous values with external components, that is to say components on the assembly or components outside the assembly, for processing. This preferably provides the opportunity to relocate at least one process step of the method according to the invention for providing proof of trustworthiness to a component of the assembly. The data interchanged with the component are particularly preferably encrypted and authentic. In a particularly preferred embodiment, communication with the component via the interface takes place only if the component has a secure engine that is able to perform security functions in a protected area in the component. The secure engine is preferably a (co) processor unit that is not readily accessible from outside and/or the program of which, processed by the secure engine, is particularly protected. In this regard, security functions are understood to mean that the secure element has been developed and produced in a tamperproof manner and is protected against known methods of attack. Furthermore, the security level of the secure element should correspond to the present prior art in each case and have certification according to a standard, for example EAL.

One likewise preferred embodiment of the secure element provides for an interface in order to interchange data with an external component secured at least by security features. The component does not need to have a secure engine as per the description for the secure element. Security features in this context are for example data integrity, data authenticity, data encryption or protection of a key from tampering. The term "component secured by security features" is understood to mean a component that for example has a cryptographic key or a unique ID that cannot be read, may also preferably be repeatedly generated by physical circumstances or is present, or stored, in obfuscated form using specific methods.

A "chain of records" platform that, based on an embedded trust anchor (secure element), supports both a trusted production chain and secure commissioning of semiconductor components and assemblies of a specific hardware platform (device) is preferably employed and used as part of the invention. The trustworthiness of the hardware platform or electronic assembly consists of a secure element (SE, known as a trust anchor or root of trust) and further, unclonable identity features. Preferably, a backend system is also used that is able to support the rollout of the necessary security services during production and of further services in the lifecycle management of a product. This may be a superordinate instance that allocates permissions to specific manufacturers that manufacture and install trusted components, or produce a trusted assembly. Backend systems for support and maintenance of the records of trust may preferably be e.g. remote certificate authorities (CAs) and certificate management systems and also authorization systems for rights management.

On the basis of a hardware platform previously produced in a demonstrably trusted manner (e.g. an embedded system), equipped with a, preferably embedded, secure element (trust anchor SE) and further, preferably complementary unclonable identities of semiconductor components or hardware components, the invention also comprises opportunities for trusted dovetailing of hardware and software during initial commissioning.

These include both the commissioning of configurable logic in an FPGA and the secure booting or bootstrapping of firmware or software (OS) by means of continuous application of the "chain of records" platform. This may apply to all security-critical processes through which an assembly with proof of hardware production needs to pass before commissioning. At the end of a commissioning, the proofs may be stored completely and in a counterfeit-proof manner in an embedded secure element (trust anchor) as commissioning records together with the proofs of production (in combination). In later phases of the product lifecycle management, the secure element (SE) and the records of trust may be interrogated directly and at any time for the purposes of digital proofs of origin and integrity. They therefore represent a digital identity of the electronic assembly, or of a piece of electronic equipment.

Support for the integrity of open source operating systems by means of the secure element is a further opportunity for use. To continue and maintain the trustworthiness of all security-relevant processes, such as for example in network and system integration, the function of the secure element is used as a constant, continually extendable trust anchor.

Mechanisms or methods that are able to ensure the protection of trustworthiness right from the time of initial commissioning are a preferred area of application of the invention. This also includes the preservation of system integrity, such as for example protection of intellectual property, which may extend both to partially reconfigurable hardware logic and to protection-worthy firmware and software as providers of intellectual property.

The inventive approach to provide trustworthiness for an electronic hardware component or assembly is based on the use of concatenated records of trust over the entire product lifecycle. The records of trust are stored in the secure element, preferably in the record memory, and may be read from the secure element at any time. The assembly is therefore able to be cryptographically checked for authenticity and for trustworthiness in situ.

Building blocks and parts of the chain of records are firstly hardware-specific features that are preferably present as a target state value, particularly preferably, when combined to form a "hardware fingerprint", are a unique feature of a specific hardware unit, or electronic assembly. Secondly, a control instruction for a multistage verified boot process could be part of the records of trust. A manufacturer could be able to create such a hardware fingerprint, e.g. as a new element, new entry or as a new target state value, in the record memory of the secure element. Such an entry could trigger a check on the fingerprint, the result of the check in conjunction with the secure element being able to influence, or interrupt, the remainder of the boot process. Both a check for equality or similarity in respect of a reference assembly and a check for uniqueness are able to take place here.

The embedding of the hardware fingerprint in conjunction with a multistage verified boot process into the records of trust already present from the production of the components within the production process, together with an extension of the trustworthiness (trusts) to the operating phase in the form of protected firmware and software, provides a completely novel, integral verification system for the trustworthiness of electronic systems and assemblies.

To ensure trusted commissioning of an electronic assembly (HW platform) and guarantee the integral operational readiness thereof, preferably successive individual process or method steps checked for trustworthiness are required. The invention provides for the secure element (trust anchor SE), as outlined above, to already contain a digitally signed production history, characterized by storage of production-related process steps, data, serial numbers or QS proofs, preferably in the form of one or more records (elements or entries) in the record memory. Said history may be checked in the ongoing commissioning process or in the operating phase, preferably by means of cryptographic functions of the secure element, but also outside the secure element. By way of example, a fingerprint could also be created in a special boot layer of an FPGA. Said fingerprint may then be encrypted or transmitted to the secure element via a protected connection and checked. When the hardware platform or assembly is initialized, ID features that may be based on hardware fingerprints of individual components are checked and, depending on the result, used for authorizing subsequent steps in the hardware initialization and/or boot process. The same approach may also accordingly be transferred to the application of fingerprints from hardware logic, firmware (FW) and software (SW). A prerequisite for the process proposed here is that, in advance of largely fully automated electronics production, so-called production records or P records are stored, preferably in the record memory of the secure element, for the purpose of acquiring hardware-related check parameters. These P records are used as target state values. If component features in the form of electrical or other parameters are present, trustworthiness may also be demonstrably derived by means of decision criteria of locally implemented AI procedures (artificial intelligence). The action and the necessary measures and components are explained in detail by way of illustration:

In one preferred embodiment, intelligent functions in the secure element may be used to provide a digital identity at the level of the hardware platform, preferably by way of the configuration of hardware fingerprinting methods, for example by means of integration of UID semiconductor technologies, e.g. by applying physically obfuscated keys (POK), and by tying the latter to unique ID features, that is to say unique identity features of individual components or of the assembly. These sometimes resource-limited cost-efficient semiconductor circuits with limited cryptographic functions may use a computer bus to allow unique cryptographic authentication of the POK by way of the SE and are a counterfeit-proof feature of a semiconductor component. Authenticity can be checked in situ, without setting up an external network connection, using the secure element and the records stored therein.

The production of the records of trust and certificate management are right at the beginning of the production chain with the creation of the records of trust. The proof of origin of the secure element, preferably in the form of a key certificate, is preferably a further, important component for establishing trustworthiness.

The invention is described and explained more thoroughly below on the basis of some selected exemplary embodiments in conjunction with the accompanying drawings, in which.

Figure 1:
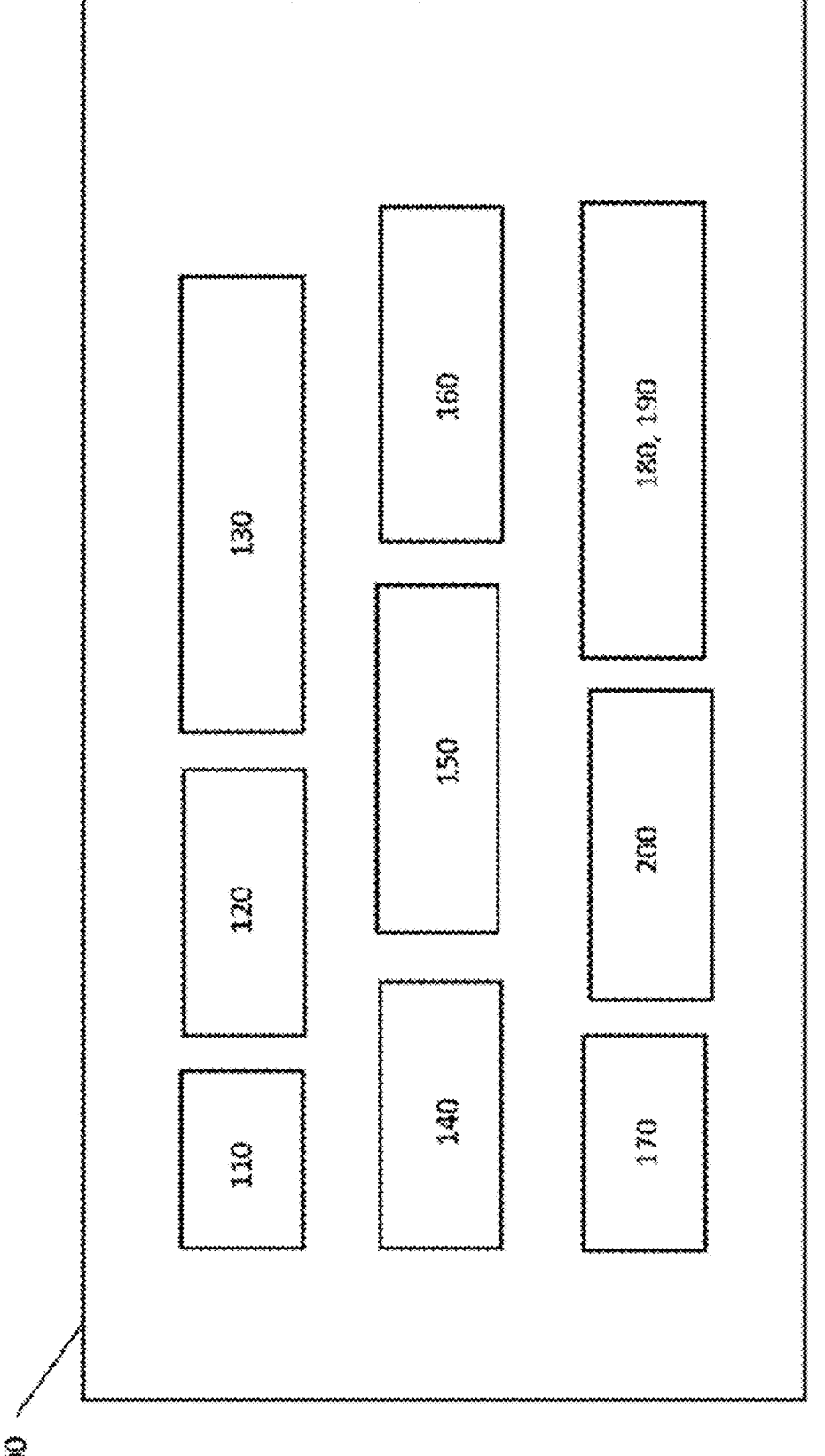
FIG. 1 shows a schematic drawing of an assembly that is intended to be proved trustworthy.

FIG. 1 shows an electronic assembly 100 with typical hardware components and subassemblies. The assembly 100 comprises a processing unit or CPU 110, an operational memory 120 that may be used to buffer-store data for processing, and a nonvolatile memory 130 that may be used to store values, which are still present in the memory even after the assembly is switched off. The assembly 100 furthermore comprises a computer bus interface 140, optionally a logic chip, e.g. a reconfigurable logic gate array, preferably an FPGA (field programmable gate array) 150, and also a communication controller 160. Furthermore, the assembly 100 may have a UID unit and a PUF unit 170. In addition, the assembly may comprise further subassemblies 180, such as for example a digital-to-analog converter 190 or other typical processing subassemblies, for example sensors.

A central part of the electronic assembly 100 is a secure element 200 used for providing proof of the trustworthiness of the assembly 100. The secure element 200 is the central element that stores security features and performs a check on recorded data, or features with present data, or features of the assembly 100, in a secure area that is not accessible or has only limited accessibility from outside. In some cases, the secure element 200 is accessed only following authorization and by authorized units or programs.

Figure 2:
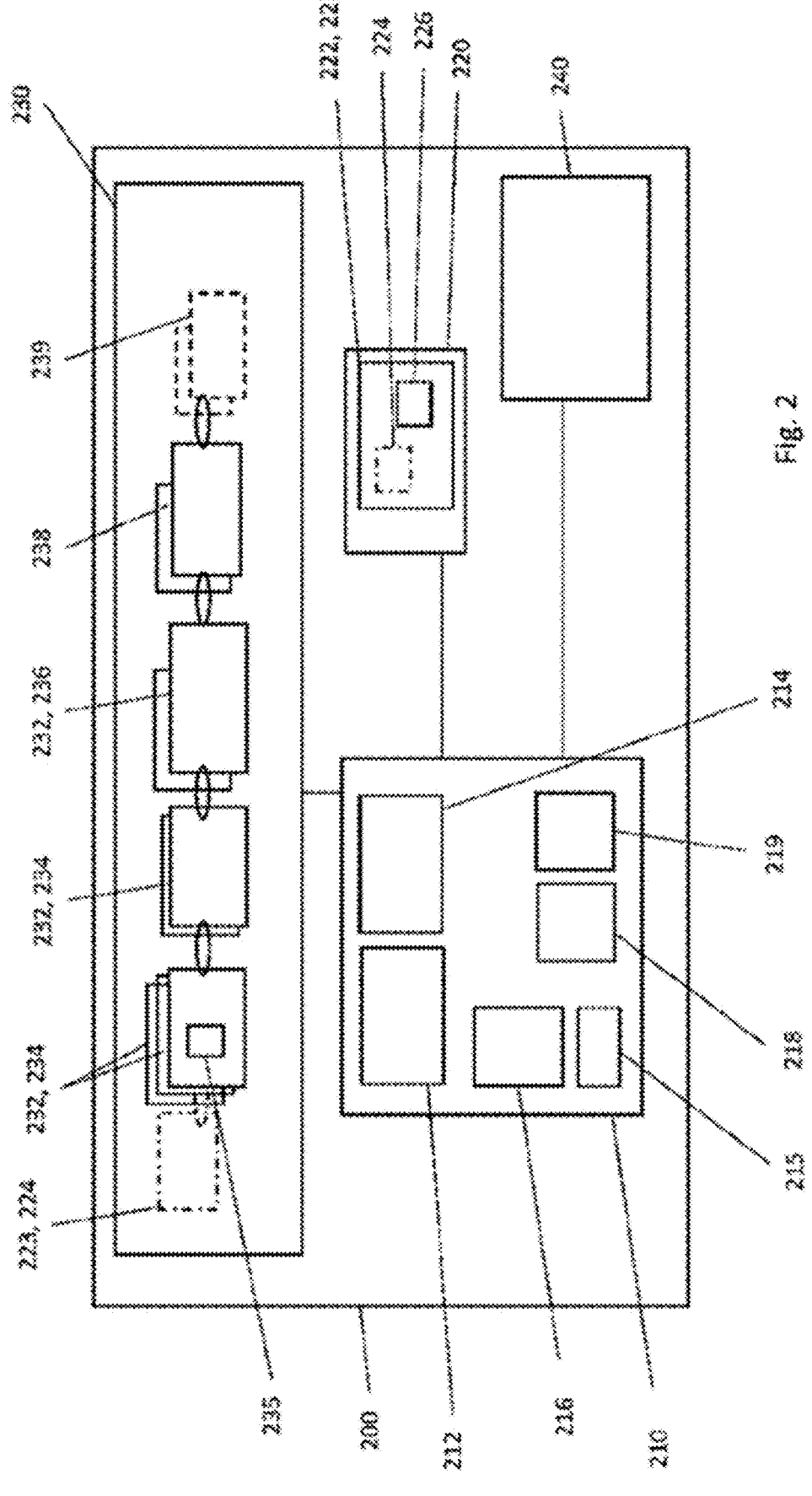
FIG. 2 shows a secure element for providing proof of the trustworthiness of an assembly.

FIG. 2 shows the secure element 200 in detail. It comprises a control unit 210, a secure memory 220 that stores a proof of origin 222, a record memory 230 containing one or preferably multiple records 232, and a communication interface 240 for data interchange with subassemblies of the assembly 100, in particular for data interchange with the CPU 110 or with the FPGA 150.

The control unit 210 comprises a processor unit 212, which may comprise an optional coprocessor (not shown), and a boot process engine 214 and preferably also an optional AI engine 216 (artificial intelligence unit). The control unit 210 may preferably comprise a random number generator 215 (RNG) in order to generate random numbers or quasi random numbers, and optionally a time generator or a clock. The control unit 210 has an actual memory 218 and a target memory 219, the two volatile memories 218, 219 being designed to buffer-store data, datasets, state values or records. The processor 212 controls the processing processes and the method for providing proof of the trustworthiness of the assembly 100, if necessary using the coprocessor and/or the AI engine 216. If this proof is provided when the assembly 100 is booted, for example, the boot process engine 214 may additionally be used for boot control, or boot-specific parameters may be read from the record memory 230.

The secure memory 220 may contain the proof of origin 222 in the form of a certificate of origin 223, e.g. as a key certificate. The certificate of origin 223 may comprise a public key 224 and a private Key 226, at least the private key 226 of a proof of origin 222 of the secure element 200 preferably being stored in the memory.

The record memory 230 preferably comprises multiple records 232, at least one record 232 of which is a production record or P record 234 that the manufacturer uses during the manufacture of the assembly 100 to store specific data of a target state, so-called target state values 235, unauthorized by the manufacturer. The P records 234 are preferably unalterable. Alternatively, one or more records 232 may comprise not only production specific features in the form of target state values, but also specific values for initial commissioning. By way of example, current or voltage responses when the assembly 100 is switched on or booted may be recorded in these IB records 236.

In addition, the records 232 may also be B records 238, in which boot configurations or boot process sequences may be recorded. Finally, it is possible for one or more records 232 to be embodied as BP records 239, which comprise results preferably of a boot process in the course of use of the assembly 100. These BP records 239 may be written to the record memory 230 by the boot process engine 214 during a boot event or after a boot event for the assembly 100. At the beginning of the record memory 230, there may preferably also be parts of the proof of origin 222, preferably the certificate of origin 223 and/or the public key 224. In this case, the certificate of origin 223 is not stored in the secure memory.

Figure 3:
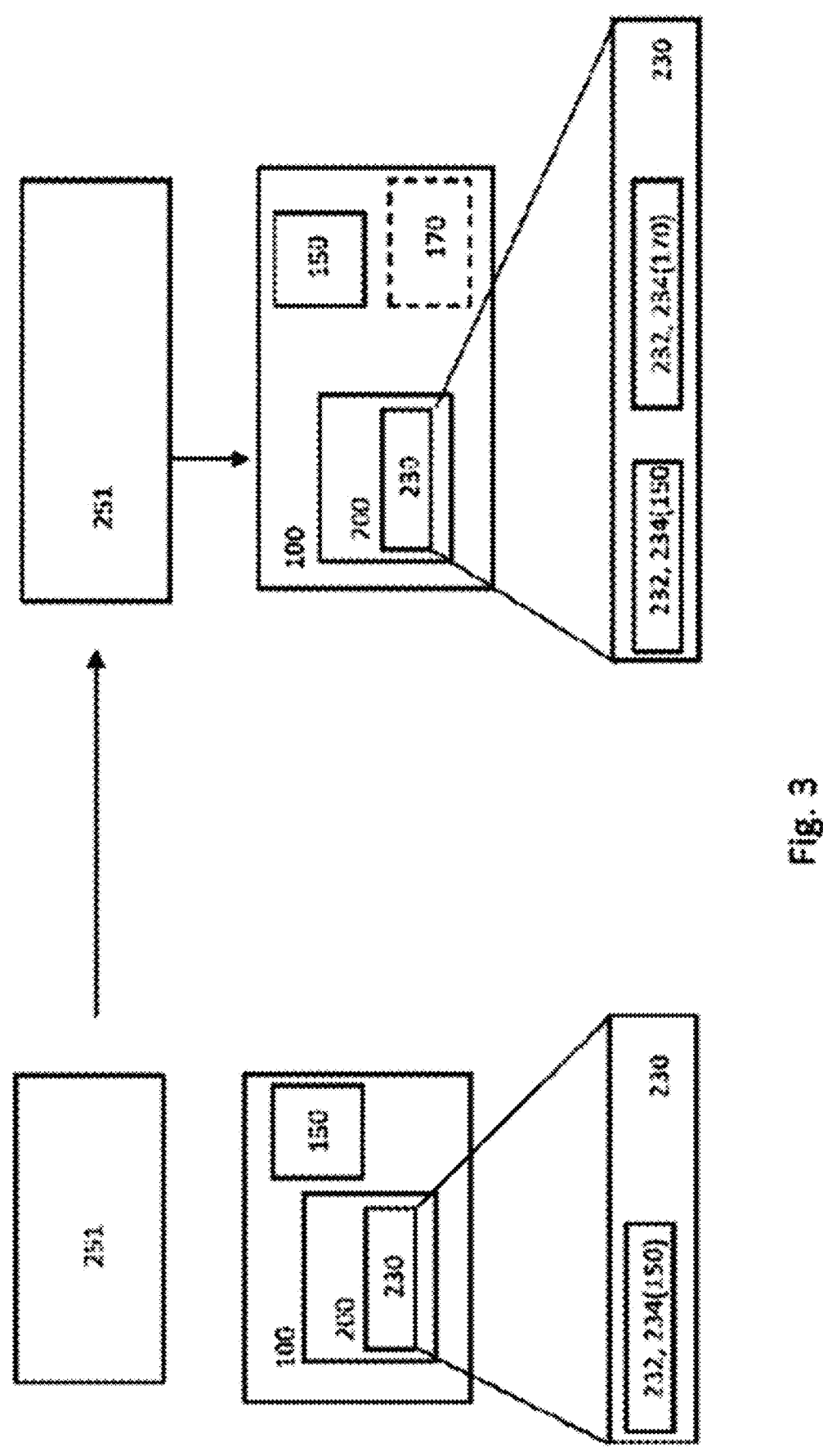
FIG. 3 shows an example of the correlation between the manufacturing process and the target state value.

FIG. 3 shows part of an authorized method of manufacture that may be used to implement a chain of records of trust. A first manufacturer 251 produces an electronic component, for example an FPGA 150, which is fitted to an assembly 100. The assembly 100 comprises a secure element 200 having a secure memory 230, as described above.

After the manufacturer 251 has, in its manufacturing process, installed the FPGA 150 produced in a trusted manner on the assembly 100, production-specific process data and preferably characteristic feature data are stored in the secure element 200. This involves writing process data and features in the form of P records 234 to the record memory 230. These P records comprise target state values 235 that characterize the trusted FPGA 150, as has been installed on the assembly 100 during trusted production. The target state values 235 in the P record 234 may comprise a serial number, a production date, a production location, designation and serial number of the production machine or other data.

These also include current or voltage values, for example at an operating point, clock frequencies or the like. It is also possible for multiple state values to be merged to form a fingerprint, and then for the fingerprint to be alternatively or additionally stored in the P record 234.

In the remainder of the trusted method of manufacture, the same manufacturer 251 or a further manufacturer 252 may install a further subassembly on the assembly 100. This subassembly may be a UID-PUF unit 170 or a sensor, for example. The characteristic values of the UID unit or of the sensor are in turn stored in the record memory 230 of the secure element 200 of the assembly 100. This is again done in the form of a record 232. During this production step too, the present target state values 235 are stored as a P record 234 and therefore characterize the currently installed subassembly. The new records 232 are preferably added to the existing records in the record memory 230 and concatenated or linked to one another. By way of example, this may be accomplished by storing a hash value of the previous record 232 in the subsequent record 232 of the new component (UID-PUF unit 170).

Figure 4:
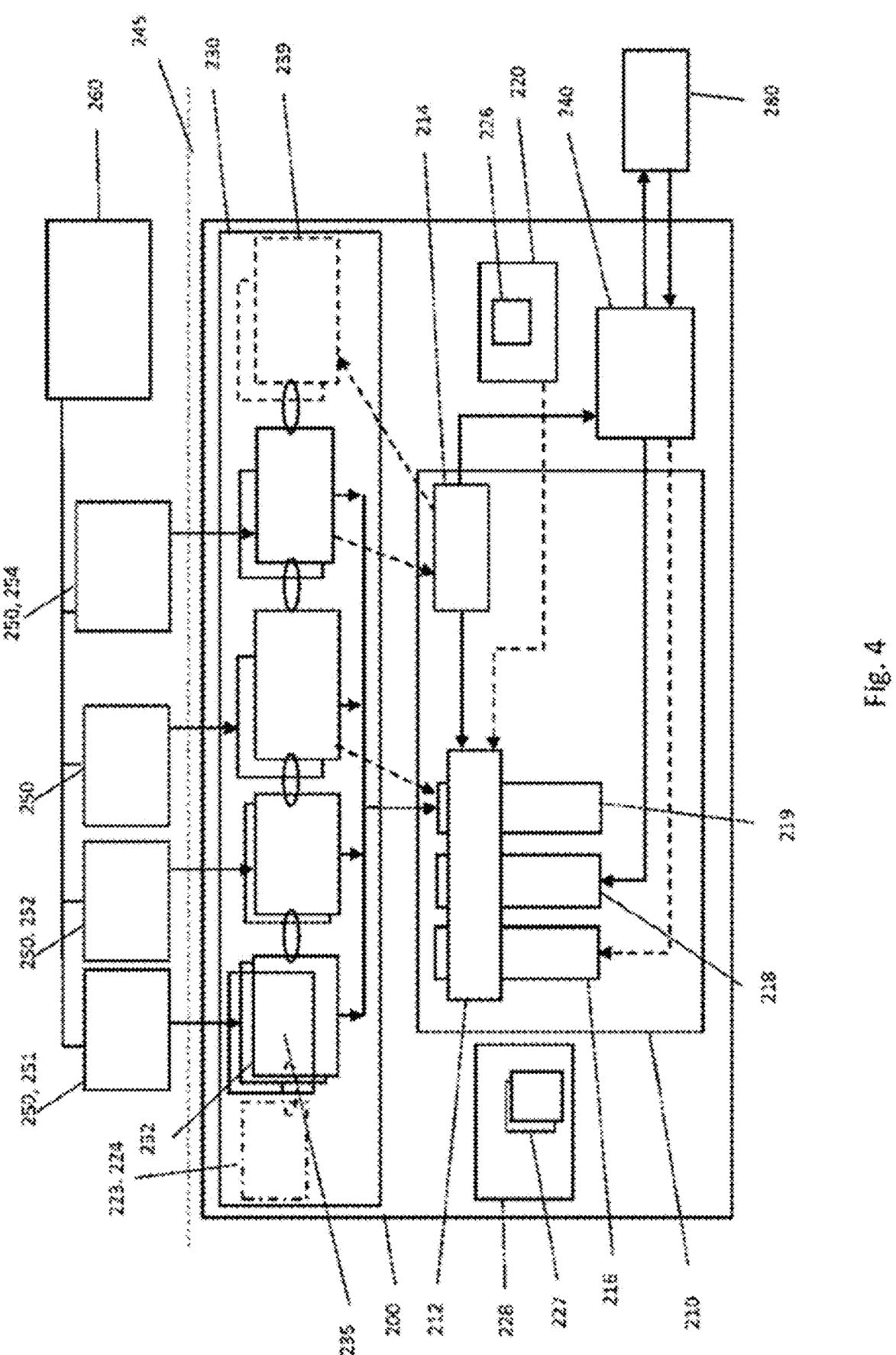
FIG. 4 shows a secure element in association with the manufacturing process.

FIG. 4 shows the secure element 200 in detail in association with the manufacturing process. Individual manufacturers 250 of individual hardware components or subassemblies of the assembly 100 are shown above a dashed line 245. As such, for example a manufacturer 251 is able to write and store a P record 234 to/in the record memory 230. Writing to the record memory takes place during the manufacturing process and is authorized. To this end, there may be provision for only authorized manufacturers 250 to be able to implement a permission to write target state values 235 to the records 232, and to be authorized by a superordinate instance 260, for example as part of a chain-of-trust system. The authorized instance 260 may be part of a chain-of-trust collaboration platform system.

A manufacturer 250 is able to write multiple datasets to a P record 234. Alternatively, a manufacturer may also create multiple P records 234. It is conceivable for a first manufacturer 251, for example, to record data of an FPGA 150 or other gate arrays in a P record. This may be for example the serial number of the FPGA 150, production date, production location, manufacturer, clock frequency or similar values. A second manufacturer 252 writes target state values 235 to a further P record 234. The second manufacturer 252 may be for example the manufacturer of a second subassembly 180, for example the nonvolatile memory 130, and writes the target state values 235 characterizing this memory 130 to the second record 232. Here too, multiple P records 234 may be created. Alternatively, a record may also store multiple target state values. The two P records 234, written to by the manufacturer 251, and 234, written to by the manufacturer 252, are preferably concatenated to one another, particularly preferably in the form of a stringing-together or chain. In this way, concatenated records of trust are formed in the record memory.

At the end of the manufacturing process, a manufacturer 254 is able to perform initial commissioning of the assembly 100 and to write a commissioning entry in the form of an IB record 236 to the record memory 230. The IB record 236 is added to the chain of records 232. By way of example, boot sequences or configurations of the startup may be stored here, these then preferably being provided in the boot process engine 214 of the control unit 210 and processed therein.

The record memory 230 may optionally comprise a proof of origin 222 or parts of a proof of origin 222 of the secure element 200. By way of example, a public key (224) and a certificate of origin 223 in the form of a record 232 may be stored at the start of the concatenated records. A prerequisite in this case is that the proof of origin 222 is recorded in the form of a public key 224 and a private key 226. The private key 226 is stored in the secure memory 220 and is able to be read only by the processor unit 212. The public key 224 and the private key 226 are used to check the authenticity of the secure element 200. This is done in the manner described above.

During the boot process of the electronic platform, a data channel 280, which is preferably secure, may be used to transfer a present status of a subassembly from the CPU 110 of the assembly 100 to the secure element 200. By way of example, the nonvolatile memory 130 may be checked when the trustworthiness is checked. This involves the CPU 110 reading specific features or data from the nonvolatile memory 130 and transferring them to the communication interface 240 of the secure element 200 via the data channel 280. An actual state value 233 is buffer-stored in the actual memory 218. The processor 212 reads the applicable values from the associated record 232, or the P record 234, for the nonvolatile memory 130 and buffer-stores them in the target memory 219. The state values are checked, for example compared, by means of the processor unit 212 in order to establish whether a trust criterion is satisfied. This could be done for example by way of a simple target/actual value comparison or a weighted and normalized comparison of the actual state values and the target state values. Alternatively, the AI engine 216 may also be engaged by the processor for the checking process, as a result of which some of the checking process is performed in the AI engine 216 for example on the basis of neural networks or other AI algorithms. Instead of comparing the target and actual values, fingerprints may be evaluated and related, in which case the target state values are stored in the records 232 as a fingerprint. A fingerprint is an intelligent combination of multiple hardware features of the electronic assembly to form an overall state value. The fingerprint as the actual state value of a subassembly 180 could also be acquired outside the secure element 200, e.g. by the CPU 110 or the FPGA 150.

Additionally, before the state values are processed, it is possible to check whether the secure element 200 has a specific proof of origin. To this end, the processor unit 212 of the secure element 200 is able to read the private key 226 from the secure memory 220. The processor 212 is used to determine the associated public key 224 and then to compare it with the public key 224 recorded in the record memory 230.

Following successful processing of the state values and assessment of whether a decision criterion is satisfied, the processor unit 212 is able to use the communication interface 240 to transmit an appropriate command to the CPU 110, or processing unit, of the assembly 100 by way of the data channel 280. Alternatively, the processor unit 212 is able to transfer the result of the decision in respect of trustworthiness to the boot process engine 214. The latter is preferably able to write a BP record 239 to the record memory 230 and to add it to the existing records 232 in the form of a new record 232. In a further step, the boot process engine 214 is then able to take the check as a basis for transferring a boot sequence command to the CPU 110 of the assembly. This is also done via the communication interface 240 and the preferably secure data channel 280. In this way, for example the boot process of the assembly 100 is able to be controlled, influenced, changed and possibly even terminated on the basis of the check on trustworthiness performed in the secure element 200. Additionally, the secure element 200 may preferably comprise manufacturer certificates 227 from one or more manufacturers 250, which are preferably stored in a certificate memory 228. The certificate memory 228 is preferably a separate memory.

Figure 5:
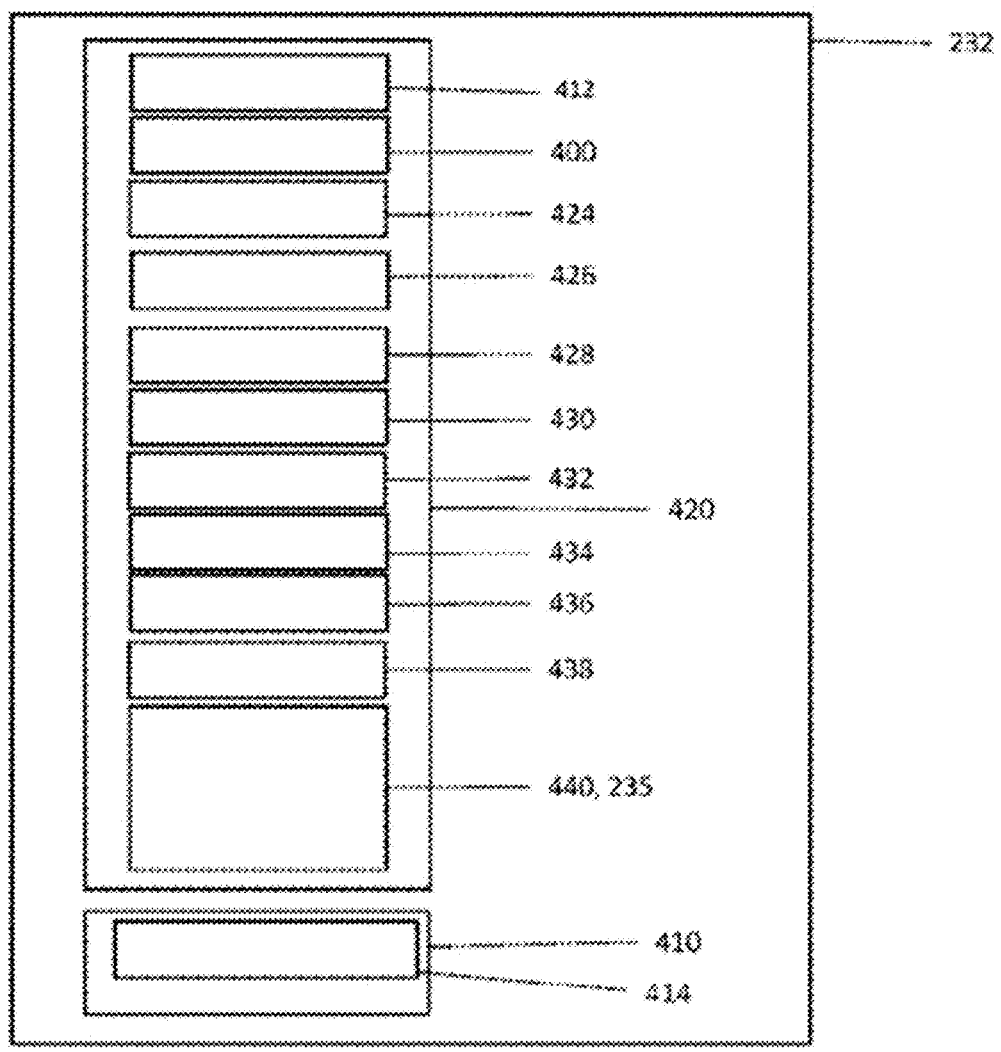
FIG. 5 shows an illustrative structure of a record from a record memory of the secure element.

FIG. 5 shows an illustrative structure of a record 232. A record 232 consists of a dataset (record data) 420 and a signature (record signature) 410. All the elements of the dataset 420 have a unique value formed for them using an algorithm. This is preferably accomplished by using a hash function. This then results in a hash value 422 that uniquely represents the dataset 420. The hash value 422 of the dataset 420 subsequently has a signature 414 formed for it, for which a manufacturer certificate 227, preferably in the form of a private key 226, of the originator of the record is required. Originators are individual manufacturers 250, 251 in the example. The public key 224 belonging to the private key 226 is part of the manufacturer certificate 227, which is likewise stored in the secure element 200. This manufacturer certificate 227 may be used to cryptographically validate the signature 414. This ensures that the record 232 was signed by the manufacturer 250 that owns the private key 226 of the manufacturer certificate 227. To identify this manufacturer certificate 227, each record 232 in the dataset 420 contains a certificate ID 430 (as reference certificate) that is also contained in the manufacturer certificate 227.

A possible concatenation of records 232 is achieved by forming, for an entire record 232, a hash value 422 that is particularly preferably entered into the subsequent record 232 as a data value 412 (hash RID-1). To support this method, a record 232 comprises a record ID 400 in the dataset 420, a value that is particularly preferably strictly monotonously rising.

Further optional elements in the dataset 420 of a record 232 are shown nonexhaustively below.

An element type 424 identifies different record types, for example IB record 236, B record 238, BP record 239. Other types are possible. Options 426 are for example an indication that the process data 440 are encrypted, or that only authorized access may take place. The originator element 427 may comprise the manufacturer name or an abbreviation for the manufacturer 250 as an addition to the certificate ID 430. Product name 432 denotes the name of an electronic assembly 100. The process step element 434 is an identification (ID) to accurately denote a specific process step.

The timestamp 436 comprises the date and time of the process step 434 performed. The result element 438 specifies the result more accurately. By way of example, the result may be "good" or "poor" or otherwise denoted more accurately. Process data 440 are data dependent on the type 424 and preferably comprise data such as process parameters, configuration parameters, target state values 235, sequence lists relating to a trusted boot process or similar data.

Figure 6:
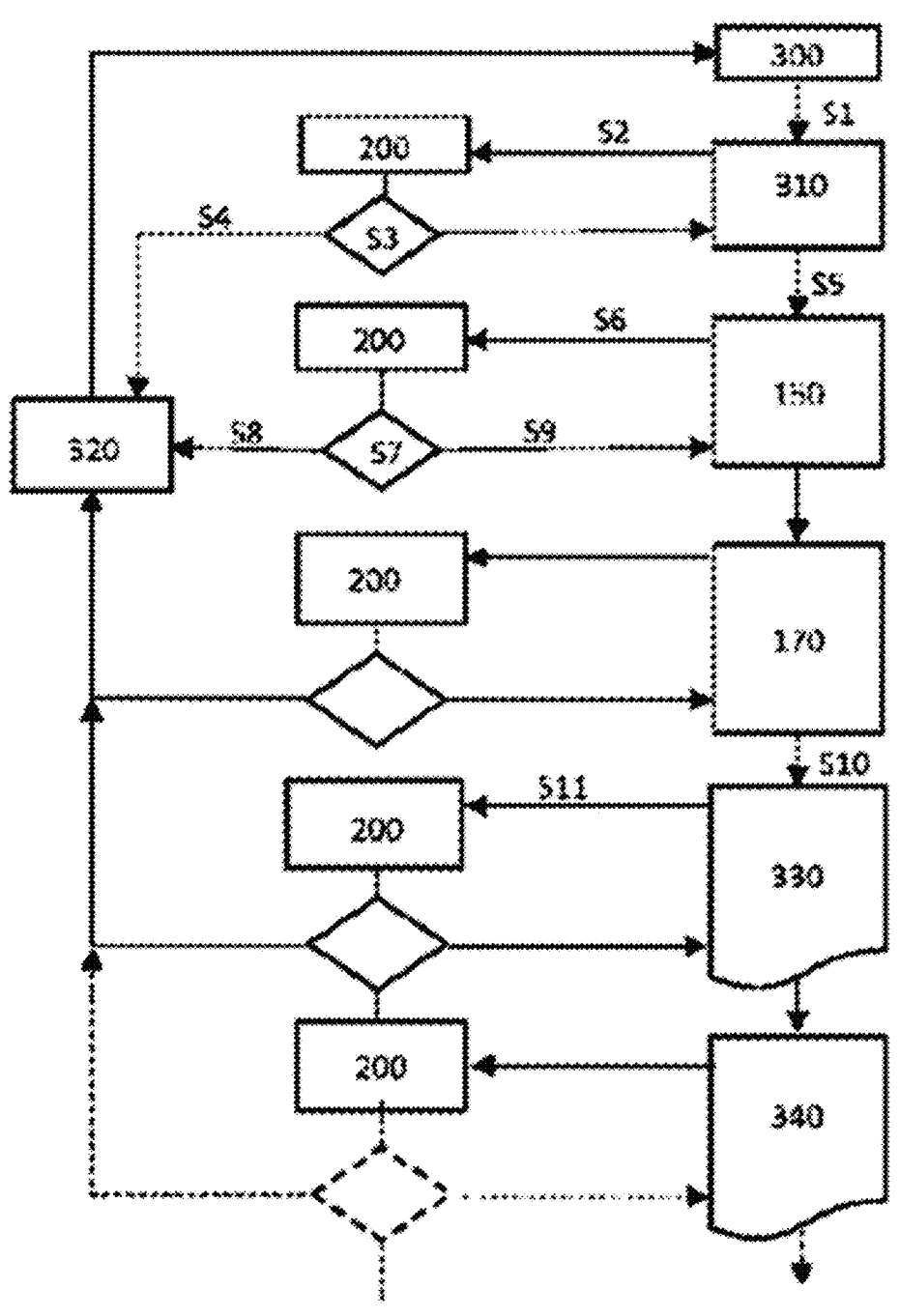
FIG. 6 shows a schematic representation of a boot process of an assembly with partial proof of trustworthiness.

FIG. 6 schematically shows part of a boot process of a trusted assembly, during which proof of trustworthiness is also provided using a secure element 200.

Following a power on reset (POR), or switch-on event 300, the CPU 110 of the assembly 100 executes a BIOS program 310 in a step S1. Following the initialization of a computer bus, the BIOS 310 checks whether a secure element 200 is present on the assembly 100 in a step S2. This is accomplished by verifying the authenticity of the secure element by retrieving and applying a proof of origin 222 in the secure element 200, preferably by way of the check on the certificate of origin 223 with the public key 224 against the trusted certificate chain for a known root certificate of the manufacturer system as proof. Additionally, the presence of the associated private key may also be checked using the challenge-response method. In a step S3, a check is performed to ascertain whether the proof of authenticity has been provided by the secure element 200. If this fails, the BIOS program branches in a step S4 to a program module (subroutine) 320 in which restrictions such as for example a reset, that is to say a power reset, are implemented. Alternatively, the secure element 200 could trigger a reset for the assembly directly if trustworthiness has broken down.

If verification is successful, the execution of the BIOS program is continued, with a component to be checked, in the example an FPGA 150, being initialized in a step S5. The FPGA 150 preferably comprises a security processor having a computer bus connection. Following initialization of the FPGA 150, a (preferably secure) connection to the secure element 200 is made in a step S6. Subsequently, the proof of origin may also be applied at this point. The actual state value 233 of the FPGA 150 is then transmitted to the secure element 200. The secure element 200 checks the actual state value 233 using an associated target state value 235 recorded in the secure element. This takes place in the control unit 210 of the secure element 200. The result concerning whether the subassembly, or the FPGA 150, is trusted, that is to say the actual state value is assessed as positive, the execution of the program is continued.

In a step S7, the result of the check on the trustworthiness of the FPGA 150 is taken as a basis for deciding how the process is continued. If the trustworthiness of the FPGA 150 is negative, the program module 320 is called S8, said program module being able to generate an error message or carry out a reset or power reset, for example. The subsequent booting of the operating system could be prevented or licensed programs that should be started on the electronic assembly are not able to be executed normally in the absence of a license. It is also conceivable for a program instruction to be able to be called that triggers a further process in the program module 320, said process having been determined by a control program in accordance with the processing of the records in the secure element 200, for example. Such a process may comprise a loading event for reconfigurable logic, for example, in order to initiate a reconfiguration of the FPGA 150.

Positive matching in step S7 results in the process being continued. As shown here using the example of the check on a UID-PUF unit 170, further subassemblies may be checked and verified analogously.

Following the conclusion of the check on further devices or components, a boot event for an operating system (OS) 330 is reached in a further step S10. Here too, the secure element 200 may in turn be called in a step S11 in order to perform a check, for example to compare a software level with a recorded target state value of a software level or to examine or retrieve licenses.

The boot process is continued in the same diagram and comprises the matching, or examined calling, of a licensed application program 340, the secure element 200 again being used here too. If, in one of the previous steps in the boot control phase, an actual state value 233 has not been regarded as trustworthy based on the target state value 235 in the secure element 200 and, as a result, a license restriction has been implemented within the secure element 200, the affected licensed application program 340 cannot start. If the criterion of trustworthiness has been satisfied, the requisite licenses are available in the secure element 200 and allow the application program to start normally.

Further steps after the sequence described here may be carried out in the boot process. They are indicated in FIG. 6 by the objects shown in dashes.

Figure 7:
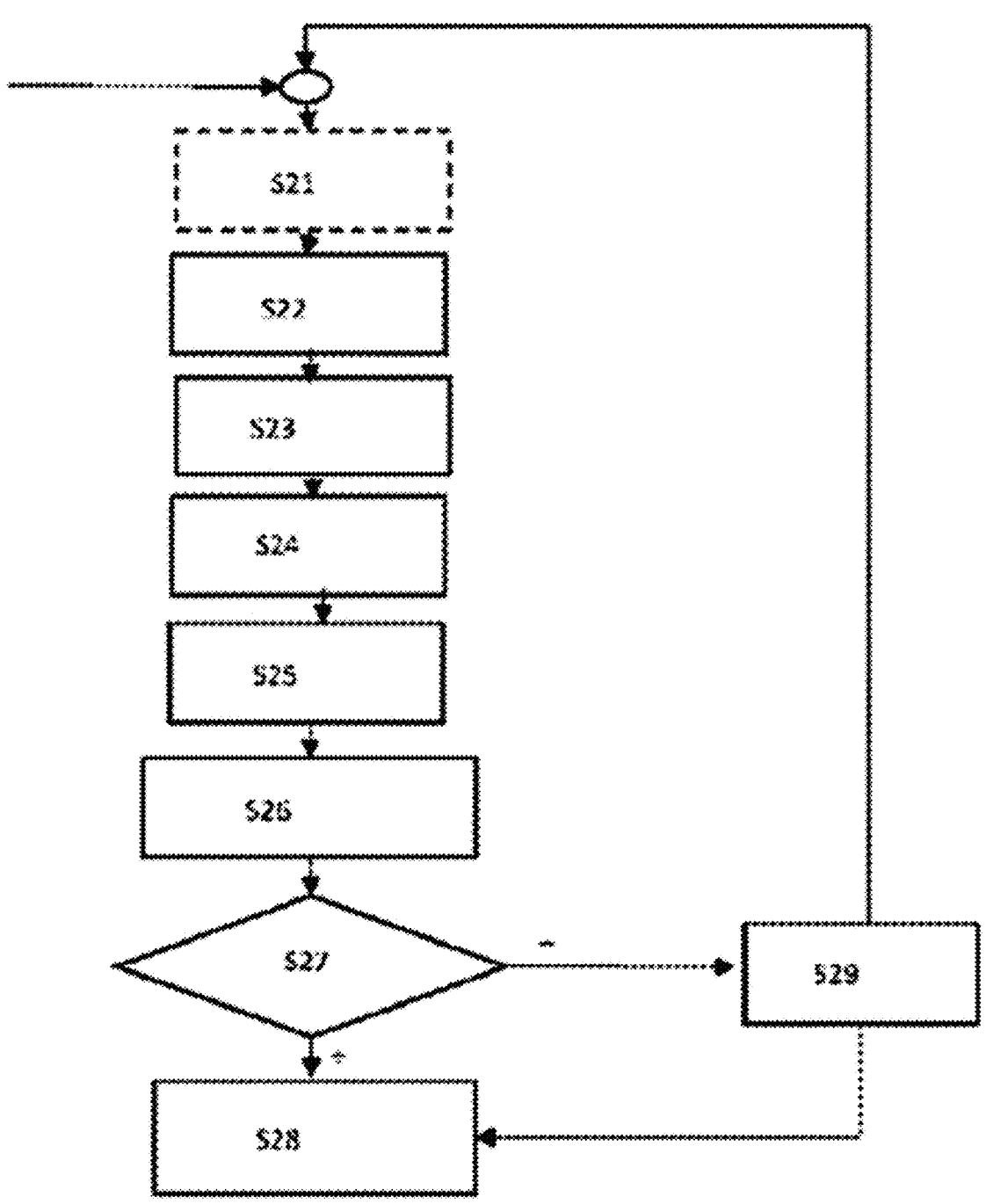
FIG. 7 shows a schematic representation of a further part of a boot process with proof of trustworthiness.

FIG. 7 shows an example of part of the boot process of an assembly 100 whose trustworthiness is intended to be checked.

In a first optional step S21, a platform or electronic assembly 100 with its CPU 110 starts the loading event for a BIOS when switched on, in order to initialize the hardware components and subassemblies of the assembly 100 and to make them available on an internal computer bus for further steps of commissioning by the operating system.

In a second step S22, the secure element 200, as the central trust anchor of the assembly 100, initializes the computer bus interface in order to be able to communicate with the components and subassemblies 180 of the assembly 100 that are connected to said interface. As a simplification, it is presupposed that the computer bus is able to be used to set up an interchange of information with other subassemblies 180 after the initialization phase has concluded.

In a subsequent step S23, an internal process in the secure element 200, a so-called boot checking program, is started. The event reads identified P records 234 from the record memory 230 in sequential order (or in a manner selected differently therefrom) and optionally decrypts them.

The data that are read may be for example target values of the electronic assembly 100 relating to the preferred or expected sequence of boot processes that have been determined as typical target values of this electronic assembly at the end of a development process.

A P record 234 that is read may also contain data that have previously been generated by authorized manufacturers and written to the P record 234 in a manufacturing and/or test process for the assembly. These may be important data from the production processes, but also values of individual subassemblies or components that are determined in tests and commissioning procedures and then written to a P record 234 as a target value (target state value) in an authorized manner.

Optionally, the concatenated records of trust, consisting of the P records 234, are then cryptographically validated completely or in part. This is accomplished by preferably also examining manufacturer certificates 227 for whether they belong to a hierarchic public key infrastructure PKI, for example of a manufacturer alliance. Additionally, the signature of the P records 234 is preferably validated using the public key of the manufacturer certificate.

In a further step S24, the P records 234 are selected for monitoring the trusted boot process.

According to step S25, a communication channel between the secure element 200 and the selected component 180 is set up, provided that the component is in an active status. This channel is used to read the actual values (actual state values 233) of the selected component. These may be for example a UID or a fingerprint of the component, transmitted in a protected manner.

In a further step S26, the target state value 235 of a component from a P record 234 is related to the actual state value 233 read in step S25 and evaluated.

In a following step S27, an evaluation algorithm decides whether a successful result has been attained. Depending on the result of a comparison or analysis operation, a subsequent process is then initiated. If an expected positively assessable result does not arise, the internal process interrupts a continuation of the boot process as provided by record or the internal process does not enable resources required for the continuation. Additionally, a boot control process record (BP record 239) may optionally be added in the record memory 230.

In a specific case, e.g. the fingerprint that is read from a component would not match the stored fingerprint of a P record. According to the flowchart, by way of illustration, this is the starting point for step S29, which returns to the start of the reset status or the power on reset status (POR status). Alternatively, there may also be provision for further restrictions in step S29, such as for example no permission to execute the next boot level (No Flash enabling to load next Boot Level), no permission to load or execute target software (No license enabling for target Software) or no handover of an encryption key (No delivery of decryption key).

In the positive case of the comparison in step S27, the continuation of the boot processes may be carried forward under the control of a boot checking program (BCP, boot control process).

A subsequent step S28 in the boot process is preferably initiated, according to the flow control, only when the preceding boot process or boot subprocess has been able to be concluded positively. To this end, the boot checking program optionally sends a message to the most recently active component of the assembly or to the processing unit 110 or the FPGA 150 indicating that the retrieval of the status of the component has been successfully checked and that the program flow control is enabled for initializing the next program section. In other words, the continuation in the sequence of the boot processes takes place in a "freely" running manner up to a subsequent checkpoint in the flow at which e.g. a further component, following initialization by drivers and preferably setup of a communication channel, is able to be interrogated about the trustworthiness (authenticity) of the hardware.

Figure 8:
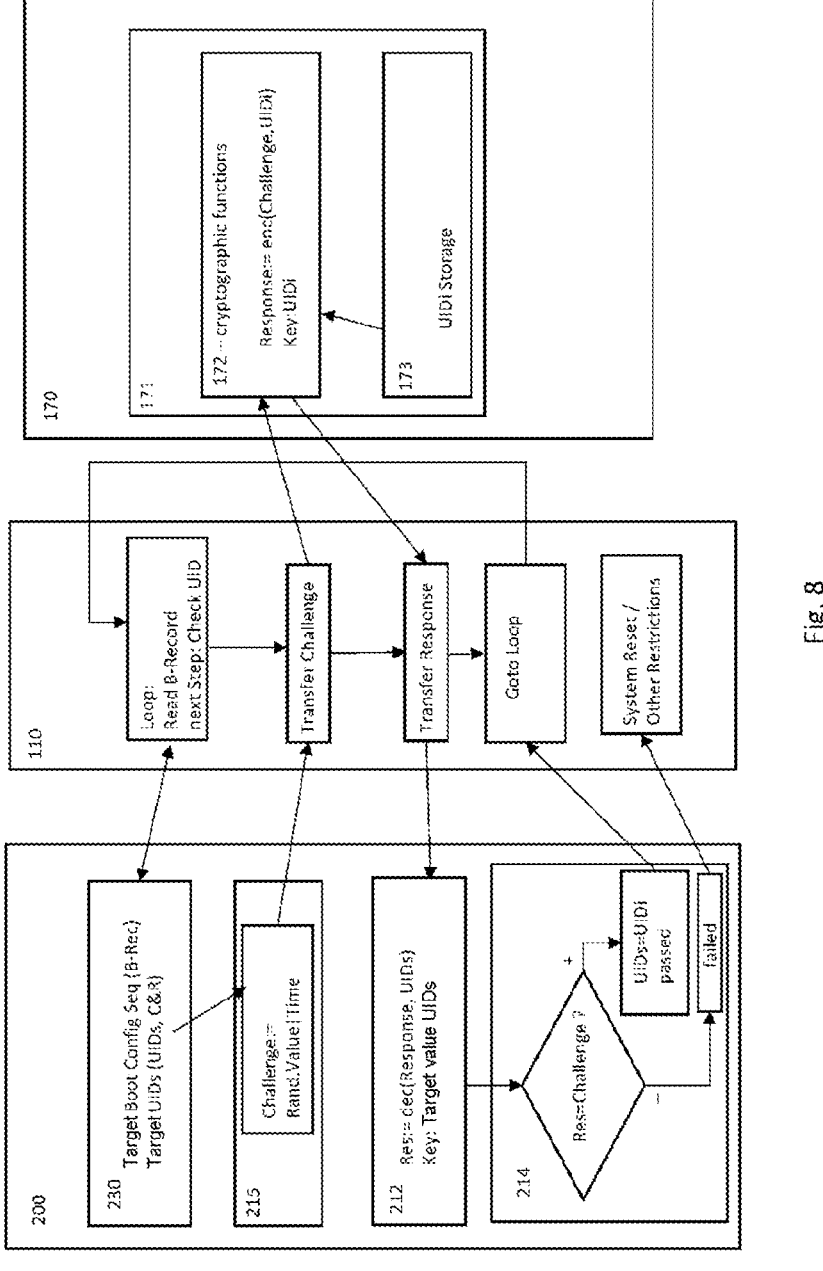
FIG. 8 shows another schematic representation of a further boot process with a secure element.

FIG. 8 shows the checking of a hardware feature on the basis of the target state values 235 in a record of trust by way of illustration.

The CPU 110 of the electronic assembly executes the starting program and checks the availability of a secure element 200. After an optional check on the proof of origin 222, the CPU 110 reads a preferably present B record comprising a list of hardware features to be checked in the assembly, that is to say of components to be checked. The hardware feature that is to be checked first of all in the sequence, that is to say the next subassembly of the assembly 100, is the UID unit 170 in this example. To this end, the secure element 200 generates a random data sequence, preferably with an appended timestamp, in the RNG (random number generator) unit 215. This data sequence is transmitted to the UID unit 170 via the computer bus with the assistance of the CPU 110.

The UID unit 171 uses cryptographic functions in a UID coprocessor 172 and encrypts the data sequence using a key UIDi taken from the UID memory 173. The UID memory 173 could also consist of a physical unclonable function.

The encrypted data are transmitted via the computer bus back to the secure element 200 (transfer response), where they are decrypted by the processor unit 212 of the secure element 200. The key UIDs used for decryption is read as a target state value from the IB record 236 that belongs to the examined UID unit and was stored in the record memory 230 during initial commissioning of the assembly.

The evaluation algorithm in the coprocessor of the secure element 200 checks the result of the decryption of the response for identity with the challenge that has been encrypted and sent to the UID unit 170. This is then the proof that the UIDs in the IB record of the target value memory (record memory 230) and the used UIDi in the UID memory 173 of the UID unit 170 are identical.

If they are identical, the check is successful, and therefore no restrictions are implemented by the secure element 200 and the response is transferred back to the CPU 110. The CPU 110 is able to continue with the next check.

If they are not identical, the check fails and the secure element is able to implement restrictions for the continued booting of the device, or of the assembly, for example a system reset or the disabling of memory resources or operating licenses.

Figure 9:
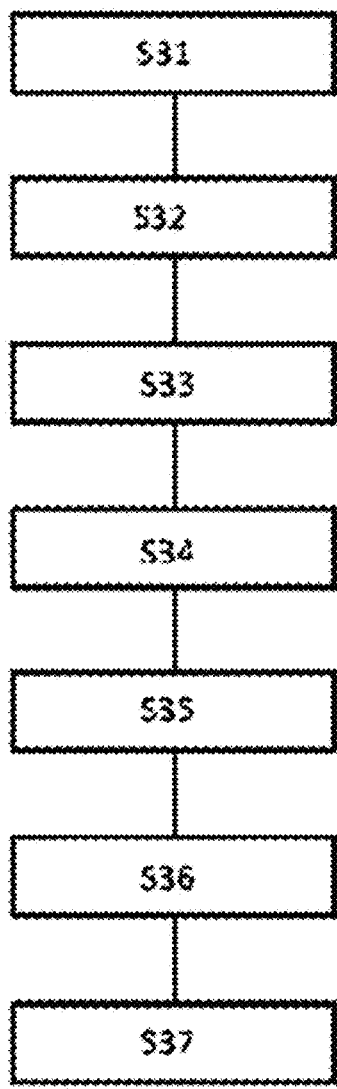
FIG. 9 shows a schematic representation of the method according to the invention.

FIG. 9 shows the basic sequence of the method according to the invention for providing proof of a trusted electronic assembly 100 having a CPU 110, a bus interface and a secure element 200. The secure element has a record memory 230 containing a target state value 235 of the assembly 100 or of subassemblies of the assembly and a proof of origin 222, which is preferably stored in a secure memory 220.

In a first step S31, an actual state value 233 of an actual state of the assembly is determined. This may be done for example by reading features of individual components or subassemblies or by means of sensors. In a further step S32, there is optionally checking and determination of whether the assembly has a secure element 200 with proof of origin 222.

A further step S33 provides for the target state value 235 to be read from the record memory 230, the target state value 235 corresponding to a target state of the assembly 100, e.g. at the time of production.

A further step S34 comprises checking the secure element 200 for authenticity by checking its proof of origin 220. A step S35 comprises processing the actual state 233 and the target state 235 and/or a comparison of the two states.

Assessing and deciding whether the actual state is similar to or compatible with the target state insofar as a trust criterion is satisfied, or whether the two states match, occurs in a step S36. An optional further step S37 provides for the use of the assembly to be influenced or authorized. Alternatively or additionally, a process carried out by the assembly may be authorized or influenced on the basis of the assessment performed in step S36.

The method described here may provide for individual method steps to be executed in a different order. In addition, individual steps or some of the predefined steps may be carried out repeatedly.

Alternatively or additionally, individual method steps may be applied not only to the assembly 100 but also to components or subassemblies of the assembly 100. As such, it has been found to be useful to determine the actual state of the assembly by checking the actual state of individual subassemblies or elements of the assembly. This involves applying the method to the individual subassemblies in an equivalent manner. An actual state of the assembly 100 is then determined by repeatedly interrogating individual devices and retrieving the actual states thereof. The actual states of the subassemblies or devices, or components, are each checked and compared with recorded target state values in the record memory 230. The trustworthiness of the assembly may be assessed by checking multiple individual devices for trustworthiness and thus obtaining an overall image of a trustworthiness of the assembly. Individual assessments of subassemblies may preferably be weighted on the basis of the security relevance of the subassemblies. A 100% check and assessment may be stipulated for individual subassemblies. The check on the trustworthiness may cover not only components and subassemblies but also firmware or software.

The invention is set out once again in summary below:

The invention describes a method for providing proof of a trusted hardware component or assembly, preferably over the entire product lifecycle. At least part of the proof may be provided locally at any time, in part by way of a cryptographic check on the datasets (records) stored in a secure element and in part by way of collection of system-specific properties (e.g. hardware fingerprint of a component), which are compared exactly or in a weighted manner with properties recorded in a secure element and are finally appraised e.g. by way of a threshold value or a yes/no decision.

The stored datasets mentioned may consist of proofs of authenticity, for example a preferably cryptographic chain of trust (example PKI), or of (cryptographic) proofs of production steps for the hardware component that have taken place during trusted manufacture.

The provision of proof is used firstly to check whether a hardware component or assembly is trusted; it may alternatively have a direct influence on the use of the operability of the hardware or assembly. This occurs, by way of example, in association with a "trusted boot process", which may be performed only if the proof of trustworthiness described above is able to be provided. In a preferred embodiment, this occurs by virtue of a key required for decrypting a boot image being available only after a check as described above.

In a further embodiment, the enabling of a nonvolatile memory, which may comprise a boot image, may be used only after a check as described above. In a further embodiment, the hardware component or assembly may be automatically reset in the event of a negative check. In a further embodiment, authenticity may also be checked via a data connection to a server.

The invention also relates to a method for securely booting a system, wherein a method for providing proof of a trusted hardware component is carried out. The invention also relates to a method for providing proof of a trusted electronic assembly, wherein at least one element for cryptographic proof of origin is stored in a secure element located on the assembly, and/or the check on a system-specific property of the hardware component influences and/or authorizes the boot process, and/or a weighted assessment of a cryptographic proof of origin or of the system-specific properties of the hardware component or assembly is able to influence and/or authorize the boot process, and/or a weighted assessment is partly or completely performed in a secure element, preferably instead of in a main processor (CPU) of the assembly, and/or the expected weighted value from the system-specific properties is stored in a secure element, and/or at least one element for providing proof of the trusted production of an assembly or hardware component is present, and/or at least one dataset influences the boot process, and/or a dataset for providing proof of trusted production is stored in a secure element located on a hardware component.

Definitions

System on Chip (SoC) denotes a system of devices that generally also contain one or more control units having appropriate peripherals. All parts are accommodated in a generally miniaturised unit, e.g. in the form of a package (SiP system in package).

Secure element (SE) is a usually protected chip having a control unit (CPU), a nonvolatile record memory and a secure memory. It preferably has, among other things, a cryptographic coprocessor (secure engine) for securely performing cryptographic functions, and typical subassemblies of an embedded controller such as interrupt controller RAM, Flash, interfaces.

An electronic assembly is a permanently assembled unit of between a few and many electronic analog and digital devices or components, which are controlled by one or more CPUs, or controllers, that are able to use typical devices such as volatile and nonvolatile memories, interface elements and additional devices or systems on chip (SoCs) and also a secure element.

A target state value of an electronic assembly comprises one or many individual target values that are statically read or determined or dynamically picked up over time or may arise as a result of a cryptographic operation. Determination is preferably also effected through the use of sensors, SoCs or specific chips having different opportunities for producing a digital identity. The target state values stored, in the broader sense, may also be state values or results that have already been stored in the records of trust in the form of a record in the secure element as part of an optionally distributed production process.

A record (in the record memory) here denotes a cohesive dataset, the content of which has integrity and which has preferably been cryptographically signed by an authorized instance. Datasets of a record comprise e.g. information, state values and payload data for the electronic assembly, the components thereof and for the entire lifecycle thereof. The records thus produced are preferably connected in a meaningful order to produce a chain, the start of which forms the first production step and optionally a proof of origin, and the end of which could contain data relating to decommissioning. This chain is called records of trust. The chain may have branch-off and reintegration branches.

To provide proof of trustworthiness, predominantly records containing data relating to the target state of the electronic assembly are optionally also stored in different operating states. The connection of the records to form a chain is preferably produced using cryptographic functions such as e.g. a hash value.

A cryptographic signature is typically provided by way of a signature using a secret asymmetric key that is in the possession of for example an authorized machine, computer, person, authority or certification authority (originator). The associated public key is preferably also stored on the secure element, or an electronic assembly, together with a cryptographically signed originator certificate, so that a check on the record chain regarding the integrity of the data and authenticity of the originators of a record is possible at any time provided that the originator certificates have been created in a hierarchic public key infrastructure. The records of trust created from records and a proof of origin therefore contribute to the trustworthiness of an electronic assembly and establish a digital identity. The proof of origin is preferably the first element in the chain.

A proof of origin of the secure element (222) consists of a certificate of origin (224) and a private key (226). The certificate of origin is preferably the beginning of the records of trust. The certificate of origin may be followed by all other types of records, connected by a cryptographic function.

The certificate of origin contains the public key for (226), data about the secure element, e.g. a serial number, preferably other typical elements for certificate management such as e.g. manufacturer reference, certificate ID, date of creation, expiry date. The certificate is signed with an originator certificate, or the private key belonging to the originator certificate.

The originator certificate, like the records, is part of a hierarchic public key infrastructure that allows all certificates involved in a hierarchic architectural structure to be traced back to a root certificate so as thereby to provide the proof that the secure element is part of a PKI structure of a manufacturer alliance and is therefore trusted. Every participating manufacturer in the alliance may be identified by its certificate.

The PKI infrastructure may be hosted in public CAs or on the manufacturer side of the electronic assembly or in an association or network of trusted manufacturer firms.

A security processor or secure engine comprises at least one CPU, a protected memory addressable only by the CPU and a protected record memory addressable only by the CPU. However, they have no proof of origin in a secure memory.

The target state, actual state and state of a component, or hardware component, comprises data and information relating to the configuration, the structure, design, etc., of the (hardware) components and/or of properties and characteristics of the component or system-specific properties, such as for example power consumption, temperature, waste heat, clock rates, processing frequencies or the like. The same applies to the states of an assembly. These may be made up of the states of the subassemblies or components and weighted at the same time.

Authorize means enable a further step in the boot process, e.g. by providing a key and by activating other components such as programs or memory areas.

The target state value comprises unique data or information relating to a hardware component that are/is generated or already available at the time of the manufacturing process. The target state value may be a dataset and e.g. stored as a so-called P record as interpretable information, e.g. in the record memory, the storage preferably taking place during the manufacturing process. The target state value may comprise proofs of origin in the form of hash values, a unique ID, a PUF or a POK or a PKI (Public Key infrastructure). The target state value or at least parts of the included data may be encrypted.

IB records are records that are stored in the record memory during the (initial) commissioning of the assembly. They contain target state values, which are different for each production item and need to be acquired in a commissioning process and added as an IB record in the record memory, e.g UIDs of IP elements or keys of POKs or checkable serial numbers.

BP records: record for storing data about an at least partially executed boot process, for example records as log files, which are stored in the record memory. They are e.g. generated during the boot process or the check for trustworthiness.

B records comprise a boot configuration, information relating to the type and order of hardware features to be checked, list of required P records or IB records.

Influence means terminate, continue, block, reset, prevent.

System-specific properties are measured variables such as e.g. voltage, current, time, frequency of a hardware component or specific ID for creating an uncopiable/clonable identity such as for example physical unclonable functions (PUF) or physical obfuscated keys (POK), secure elements with checkable proof of origin.

Hardware component comprises at least one command execution unit.

Dataset is an optionally cryptographically secure dataset that represents a trusted production step.

The words "comprise" and "having" in the patent claims do not preclude the presence of further elements or steps. The indefinite article "a" or "an" does not preclude the presence of a plurality. A single element or a single unit is able to perform the functions of multiple instances of the units cited in the patent claims. Part or all of an element, a unit, an apparatus and a system may be implemented in hardware and/or in software. The mere mention of some measures in multiple different dependent patent claims should not be understood to mean that a combination of these measures cannot likewise be used advantageously. A computer program may be stored/sold on a nonvolatile data carrier, for example on an optical memory or on a semiconductor drive (SSD). A computer program may be sold together with hardware and/or as part of a piece of hardware, for example by means of the Internet or by means of wired or wireless communication systems. Reference signs in the patent claims should not be understood to be limiting.

The invention claimed is:

1. A method for proving a trustworthy electronic assembly with a CPU, a bus interface and a secure element, the secure element comprising a proof of origin of the secure element and a record memory with a target state value of the assembly, the secure element further comprising a control unit, wherein the proof of origin comprises a private key of the secure element and a key certificate with a public key, the method comprising:

authenticating the secure element by verifying a proof of origin of the secure element without involvement of any external trusted party, by:
(a) reading a public key of the secure element,
(b) verifying entirely within the secure element that the private key, which exists in the secure memory of the secure element, corresponds to the public key in the key certificate; and the method further comprising:

determining an actual state value of an actual state of the assembly;

reading from the record memory at least one target state value, comprising at least the public key of the secure element and the serial number of the assembly and, wherein the target state value represents a target state of the assembly;

comparing in the control unit of the secure element the target state value and the actual state value; and determining in the control unit of the secure element whether the actual state value is compatible with the target state value or meets a predefined trust criterion.

2. The method according to claim 1, wherein the method steps a) and b) are executed one time and wherein the further steps may be executed multiple times.

3. The method according to claim 1, further comprising:

based on the determining, authenticating in the control unit of the secure element the use of the assembly or the use of a process that the assembly performs.

4. The method of claim 3, further comprising:

in response to the determining, locking or releasing parts of the assembly or components of the assembly, resetting the assembly, or terminating one or more functions of the assembly.

5. The method of claim 1, wherein the proof of origin is stored encrypted in the secure element.

6. The method of claim 5, wherein the proof of origin is stored encrypted in a secure memory of the secure element, the secure memory being different from the record store.

7. The method of claim 6, wherein the reading of the public key of the secure element is performed before verifying that the private key corresponds to the public key in the key certificate.

8. The method according to claim 1, wherein verifying that the private key corresponds to the public key in the key certificate further comprises:

generating a new random data value, sending the data value to the secure element;

encrypting the data value with the private key of the key certificate of the proof of origin in the secure element, outputting a result value from the secure element, decrypting the result value with the public key of the key certificate, and confirming the result value using the generated data value.

9. The method of claim 1, wherein the method is performed during the boot process of the assembly.

10. The method of claim 9, wherein the boot process of assembly components is altered by performance of the method.

11. The method according to claim 1, wherein the method is executable during the boot process, wherein the boot process is altered by performance of the method.

12. The method of claim 11, wherein the sequence of the boot process is changed based on performance of the method.

13. The method of claim 1, wherein a proof element for proving the trustworthy production of an assembly in the form of a target state value of the assembly is stored at the record memory, wherein the proof element comprises information of the manufacture or processing of the assembly, and wherein a plurality of proof elements including the proof element are linked to each other in the record memory in an unalterable chain.

14. The method according to claim 1, wherein based on a completed check of the trustworthiness of the assembly, a new proof element for the record memory is created and stored in the record memory, the new proof element being generated and stored exclusively within the secure element without reliance on an external trusted party.

15. The method of claim 14, wherein the new proof element is linked to the plurality of proof elements in the record memory in the form of a cryptographically chained structure, internally within the secure element.

16. The method of claim 1, wherein the target state value comprises a plurality of features of the assembly and the features are specific or characteristic parameters for the component or assembly.

17. A secure element for proving the trustworthiness of an electronic assembly, comprising:

a control unit;

a record memory comprising production records with target state values, each production record being cryptographically linked and unalterable after manufacture;

a secure memory comprising a private key uniquely generated and bound to the secure element during manufacture, and the corresponding public key, and a proof of origin of the secure element, wherein the proof of origin comprises, a public key and a private key of the secure element, wherein the control unit is configured to authenticate the secure element autonomously, without reliance on an external trusted party, by verifying existence of the private key, which exists in the secure memory of the secure element, with the public key;

wherein the control unit is configured to, in the control unit of the secure element, compare an actual state value of the assembly with one or more of the target state values from the record memory; and wherein the control unit is configured to determine whether the actual state value is compatible with the one or more target state values or meets a confidence-trust criterion.

18. The secure element according to claim 17, wherein the secure memory is encrypted.

19. The secure element according to claim 18, wherein the secure memory stores a plurality of proofs or origin, and at least a portion of the proofs of origin stored in the secure memory are encrypted.

20. The secure element according to claim 17, wherein a sequence of several target state values of the plurality of target state values are carried out in a specified order.

21. The secure element according to claim 17, wherein the plurality of state values of the record memory comprise a plurality of target state values of the assembly in the form of the production records.

22. The secure element according to claim 17, wherein the secure element performs a weighted evaluation of the actual state value and the one or more target state values to prove trustworthiness.

23. The secure element according to claim 17, wherein the target state values comprise a plurality of features of the assembly or a component of the assembly, wherein the features are specific or characteristic parameters for the component or assembly.

24. The secure element according to claim 17, wherein the secure element has an interface to outsource one or more portions of proving trustworthiness to a component of the assembly.

25. The secure element according to claim 24, wherein exchanged data are encrypted with the component and the component has a secure engine that performs security functions in a protected area, or the component is secured by security features.

26. Electronic assembly having a CPU, a bus interface and a memory, characterized in that the assembly comprises a secure element for proving the trustworthiness of the assembly, wherein the secure element has a control unit, a record memory and a secure store, wherein the secure element is formed according to claim 17.

27. Hardware component having a protected security processor for proving the trustworthiness of an electronic assembly, wherein the hardware component comprises a record memory and a secure storage, wherein the hardware component is part of the assembly to be authenticated and the hardware component performs the method according to claim 1.

* * * * *